UNITED STATES PATENT OFFICE.

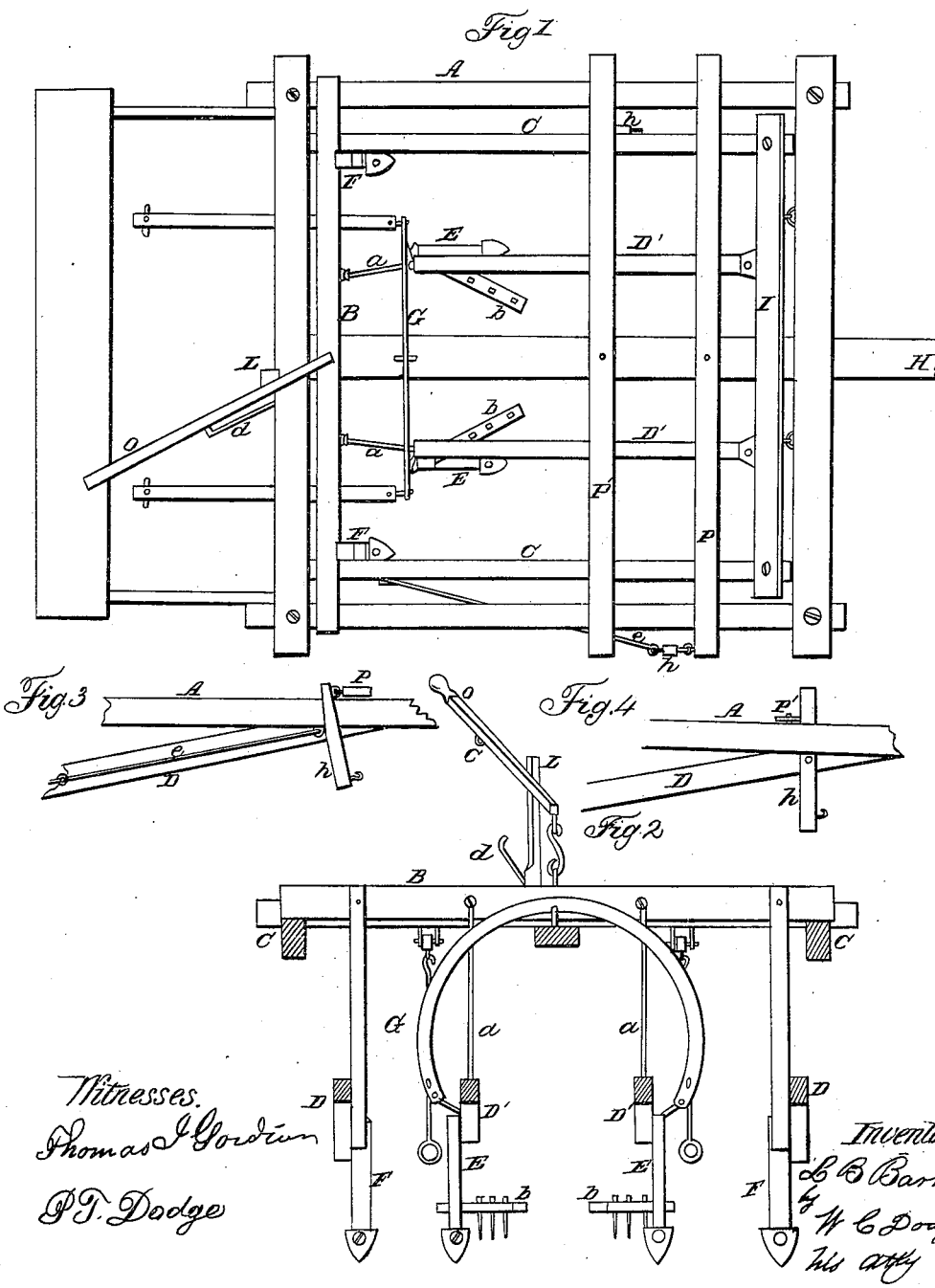

L. B. BARTON, OF METAMORA, ILLINOIS.

IMPROVEMENT IN CULTIVATORS.

Specification forming part of Letters Patent No. 50,439, dated October 17, 1865.

*To all whom it may concern:*

Be it known that I, L. B. BARTON, of Metamora, in the county of Woodford and State of Illinois, have invented certain Improvements in Cultivators; and I hereby declare the following to be a full, clear, and exact description thereof, reference being had to the accompanying drawings, making part of this specification, and to the letters of reference marked thereon, in which—

Figure 1 is a top-plan view; Fig. 2, a transverse section taken in the line $x\,x$ of Fig. 1; and Figs. 3 and 4 are views of detached portions of the same.

The nature of my invention consists in a novel plan of attaching the draft-rod to the plow-beams, and in an improved method or arrangement of devices for elevating the plows from the ground, &c.

To enable others skilled in the art to construct and use my invention, I will proceed to describe it.

This invention is an improvement upon the cultivator recently patented to me. This description will therefore be confined to such parts only as are new, and so much of the original as may be necessary to explain the same.

A represents the main frame, to the front portion of which a cross-bar, I, is hinged, as shown in Fig. 1. Two bars, C C, are rigidly attached at their front ends to the bar I and at their rear ends to the bar B, parallel with and inside of the side bars of the main frame A. Directly underneath the bars C, on each side, a plow-beam, D, is attached, as shown in Figs. 3 and 4, and to these are secured the standards F, having shovel-plows secured at their lower ends, their upper ends being fastened to the bar B, these plows having only a vertical movement in connection with the inside frame.

Two intermediate beams, D' D', are pivoted at their front ends to bar I, as shown in Fig. 1, being supported at their rear by the rods $a$ $a$, attached to the cross-bar B, the bent frame G, pivoted on top of the tongue H, serving to impart to them a lateral motion, when desired, as in my former patent.

To the lower portion of the standards E, I secure the harrows $b$, one to each, in such a position that as the cultivator straddles the row they will serve the twofold purpose of preventing clods from rolling or being thrown by the inner shovels or plows upon the young plants, and at the same time thoroughly harrow or cultivate the ground close alongside of the row of plants.

To the rear portion of the frame I attach rigidly an upright or standard, L, having a lever, O, pivoted thereon, as shown in Fig. 2, the front end of said lever being connected to the cross-bar B.

A hook, $d$, attached to the main frame, hooks into the eye $c$, secured to lever O, when the latter is depressed, by which the inner frame and all the plows are held suspended clear from the ground.

A sway-bar or double-tree, P, is pivoted upon the tongue, as shown in Fig. 1. A rod, $e$, is attached to the outside plow-beams, D, as shown in Fig. 3, and extends forward to near the double-tree P, its front end being pivoted to a perpendicular lever, $h$, the upper end of which is fastened to P by a joint, as shown in Fig. 3, a hook being provided at the lower end of $h$ for the purpose of attaching one of the horses thereto, this device or arrangement being, of course, duplicated on the opposite side of cultivator for attaching the other animal. By this method of attaching the draft-animals I secure two important results: first, the plows are drawn so as to cause them to enter the ground readily, and, secondly, the animals' necks are relieved from the downward pressure of the tongue—so objectionable in cultivators as usually constructed.

In Fig. 4 a modified plan for producing the same results is shown. In the latter case the lever $h$, instead of being attached to the rod $e$, is pivoted directly to the side of the beam D, the rod $e$ being thereby dispensed with. By pivoting the lever $h$ in front of the double-tree P' its upper end simply rests against the latter, thereby doing away with the necessity for any links or hooks for connecting them, as is required when the former plan is adopted.

Having thus described my improvements, what I claim is—

1. The combination and arrangement of lever $h$, beam D, and double-tree P', as shown in Fig. 4.

2. The lever $h$, in combination with the double-tree P, rod $e$, and beam D, the latter having its front end pivoted to the main frame, and all the parts arranged to operate as and for the purpose herein set forth.

3. The harrows $b$, in combination with the central swinging plows, as shown and described.

4. The combination and arrangement of the standard L, lever O, and cross-bar B, as and for the purpose set forth.

L. B. BARTON.

Witnesses:
W. SUMNER,
J. C. MYERS.